United States Patent [19]

Rapoport et al.

[11] Patent Number: 5,561,522
[45] Date of Patent: Oct. 1, 1996

[54] INTEGRATED BIREFRINGENT-BIASED PRESSURE AND TEMPERATURE SENSOR SYSTEM

[75] Inventors: William R. Rapoport; Janpu Hou, both of Bridgewater, N.J.

[73] Assignee: AlliedSignal Inc., Morris Township, N.J.

[21] Appl. No.: 411,186

[22] Filed: Mar. 27, 1995

[51] Int. Cl.$^6$ .................................................. G01B 9/02
[52] U.S. Cl. ........................ 356/351; 356/352; 356/33; 374/132; 374/161
[58] Field of Search ...................... 356/351, 352, 356/345, 43, 33, 44, 35.6; 374/131, 132, 161, 181; 385/130; 250/227.19, 227.27

[56] References Cited

U.S. PATENT DOCUMENTS

| | | | |
|---|---|---|---|
| 3,909,132 | 9/1975 | Barrett | 356/352 |
| 4,466,295 | 8/1984 | Wesson | 73/862.38 |
| 4,529,262 | 7/1985 | Ashkin et al. | 350/96.15 |
| 4,998,017 | 3/1991 | Ryan et al. | 250/343 |
| 5,064,270 | 11/1991 | Turpin et al. | 356/351 |
| 5,249,865 | 9/1993 | Paranjpe et al. | 356/351 |
| 5,255,068 | 10/1993 | Emo et al. | 356/351 |

*Primary Examiner*—Frank Gonzalez
*Assistant Examiner*—Reginald A. Ratliff
*Attorney, Agent, or Firm*—Verne E. Kreger, Jr.

[57] ABSTRACT

An integrated optical temperature and pressure sensor system that is birefringently biased. A broad band light source is transmitted via a fiber optic cable having a splitter, a collimator and a polarizer to a first birefringent bias element. The first birefringent element has a partially reflective coating to reflect back a portion of the light signal to the first polarizer to yield a first reflective modulated light that consists of temperature information irrespective of external forces. The non-reflected light continues to a second birefringent bias element. The second birefringent crystal provides additional birefringent bias to the light wave before the light wave enters an isotropic pressure sensor media. An external pressure applied to the sensor causes the light to experience stress-induced birefringence. The sensor comprises a highly reflective surface which redirects the light back through the sensor, both bias crystals and the polarizer to yield a second reflective modulated light spectrum. The splitter which directs a combined light spectrum comprising a portion of each reflected light spectrum to an optoelectronic interface where the intensity vs. wavelength signal is extracted by a CPU. The CPU performs a Fourier transform on the signal to reveal a first phase term at a selected frequency that relates to the temperature of the system and a second phase term at a different selected frequency that relates to the temperature of the system and the externally applied pressure on the sensor. Subtracting out the temperature term from the temperature and pressure term provides the pressure value.

9 Claims, 9 Drawing Sheets

INTEGRATED BIREFRINGENT-BIASED PRESSURE AND TEMPERATURE SENSOR SYSTEM

FIELD OF THE INVENTION

The invention relates to a birefringent-biased integrated optical temperature and pressure measurement.

BACKGROUND OF THE INVENTION

It is desirable for optical sensors to detect temperature, pressure, torque, position etc. and be immune from electrical interference. Wesson describes in U.S. Pat. No. 4,466,295 means for using the photoelastic effect to measure stress in plates that can be related to externally applied forces. The sensor disclosed in Wesson is not particularly effective because the output signal is light intensity dependent and is adversely sensitive to environmental effects to the overall sensor system. A further drawback is that the sensor output is linear over only a narrow pressure range. Therefore, one must calibrate multiple sensors over different pressure ranges.

Temperature sensing devices utilizing birefringent crystals are described by Emo et al. in U.S. Pat. No. 5,255,068 entitled "Fringe Pattern Analysis of a Birefringent Modified Spectrum to Determine Environmental Temperature" which is incorporated herein by reference. Emo et al. describe an optical high temperature sensor based on a birefringent element made of a single crystal. A broad band light spectrum is transmitted through a first linear polarizer creating a linearly polarized wave. The linearly polarized wave passes through a single crystal birefringent plate at 45° to the optical axis of the crystal. The polarized wave can be represented by two equal linear polarized vectors which are aligned along the optical axes. Propagation of these waves through the birefringent plate introduces a temperature dependent phase shift between the two waves. Thereafter, a second linear polarizer combines the two waves creating a modulated spectrum. Information derived from this modulated spectrum or fringe pattern is then used to measure the temperature of the birefringent plate.

SUMMARY OF THE INVENTION

The present invention consists of an integrated optical temperature and pressure sensor system comprising birefringent media whereas the total birefringence/length product remains within the accepted tolerances of current devices. A broad band light source is transmitted via a fiber optic cable comprising a splitter, a collimator and a polarizer to a first birefringent bias element. The first birefringent element has a partially reflective coating to reflect back a portion of the light signal to the first polarizer to yield a first reflective modulated light that consists of temperature information irrespective of external forces. The non-reflected light continues to a second birefringent bias element. The second birefringent crystal provides additional birefringent bias to the attenuated signal before the light wave enters an isotropic pressure sensor media. An external pressure applied to the sensor causes the light to experience stress-induced birefringence. The sensor comprises a highly reflective surface which redirects the light back through the sensor, both bias crystals and the polarizer to yield a second reflective modulated light spectrum The fiber optic cable transmits both first and second reflective light sources to the splitter which directs a combined light spectrum comprising a portion of each reflected light spectrum to an opto-electronic interface where the intensity vs. wavelength signal is extracted by a CPU. The CPU performs a Fourier transform on the signal to reveal a first phase term at a selected frequency that relates to the temperature of the system and a second phase term at a different selected frequency that relates to the temperature of the system and the externally applied pressure on the sensor. Subtracting out the temperature term from the temperature and pressure term provides the pressure value.

It is a principal object of this invention to provide a sensor system that is capable of accurately measuring the effects of external pressures applied to a sensor and further provides separate temperature data in order to deconvolve the pressure/temperature signal from the sensor.

DETAILED DESCRIPTION OF THE PREFERRED EMBODIMENTS OF THE INVENTION

The preferred embodiments of this invention will be better understood by those skilled in the art by reference to the above Figures. The preferred embodiments of this invention illustrated in the Figures are neither intended to be exhaustive nor to limit the invention to the precise form disclosed. The Figures are chosen to describe or to best explain the principles of the invention, and its application and practical use to thereby enable others skilled in the art to best utilize the invention. For example, a portion of the invention is disclosed as a pressure sensor to measure an external pressure. The invention is equally applicable for use in other types of sensors and systems, such as force sensors and accelerometers.

Figure 1:
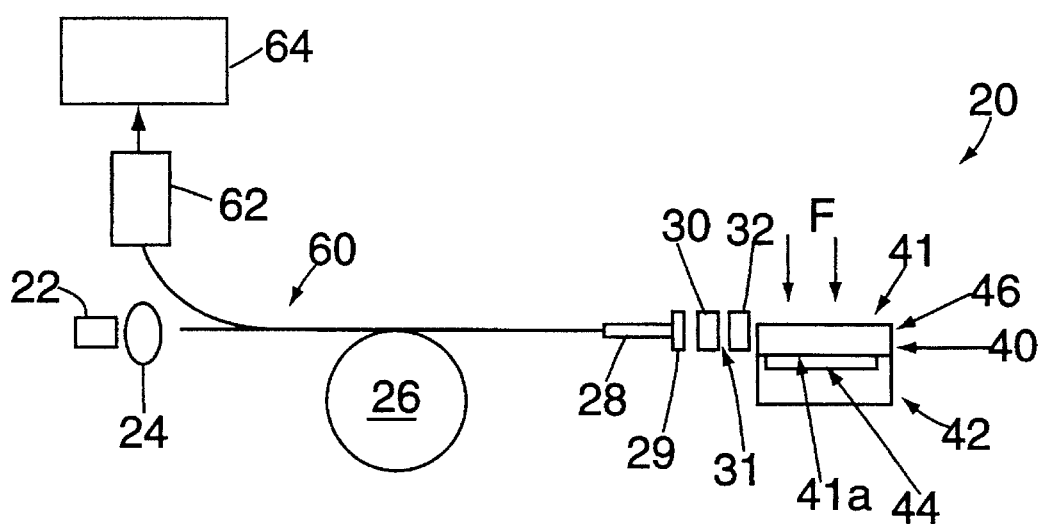
FIG. 1 is a schematic of a preferred embodiment of the invention.

The combined temperature and pressure sensing system 20, shown in FIG. 1, includes a sensor 40 in combination with a first birefringent biasing crystal 30 and a second birefringent biasing crystal 32. The birefringence bias is such that $$2 \cdot ABS \cdot [L_1 \cdot B_1] = A \lambda \qquad [1]$$

and $$2 \cdot ABS \cdot [L_1 \cdot B_1 + L_2 \cdot B_2] = B \cdot \lambda \qquad [2]$$

Where $L_1$ and $L_2$ are the lengths of respective crystals 30 and 32, $B_1$ and $B_2$ are the respective birefringence, $\lambda$ is the central wavelength of the broad band light source 22, ABS refers to the absolute value of the enclosed terms and the multiplier 2 represents the double-pass feature of the invention. Preferably, the crystals are made from the same material so that $B_1 = B_2$, but it is not a requirement. Coefficients A and B represent approximately the number of orders of the effective waveplate and are the canonical values used in available temperature sensing devices that describe the number of full cycle of polarization rotation that the linearly polarized broad band light undergoes while traversing the crystal. A and B are functions of the overall system design, including the wavelength and band of light source 22 and the opto-electronic interface 62 that has its own characteristic wavelength range and resolution. Desired system accuracy determines the amount of birefringent bias and the values of A and B. Exemplary values of A and B may be in the range from about 20 to 60 where A<B. For example, A may equal 30 and B may equal 50. It is possible to increase or decrease the birefringent bias in relation to changes of other system parameters and still maintain overall system accuracy.

Generally, crystals are anisotropic with respect to their physical properties, that is, their property values vary with the direction in the crystal. Anisotropy of the refractive index is called birefringence and is defined as $n_e - n_o$, where $n_e$ is the extra-ordinary index of refraction, and $n_o$ is the ordinary index of refraction. Certain crystals can be categorized as positive or negative depending on whether the $n_e$ term is larger or smaller than $n_o$. The terms $n_e$ and $n_o$ are not used for crystals that have 3 separate refractive indices such as BeL (Beryllium Lanthanate). In that case, terms such as $n_a$, $n_b$, and $n_c$ can be used and any 2 such terms and their respective temperature dependent birefringent terms (dB/dT) can be substituted giving a total of 3 separate cases for this class of crystals.

Figure 2:
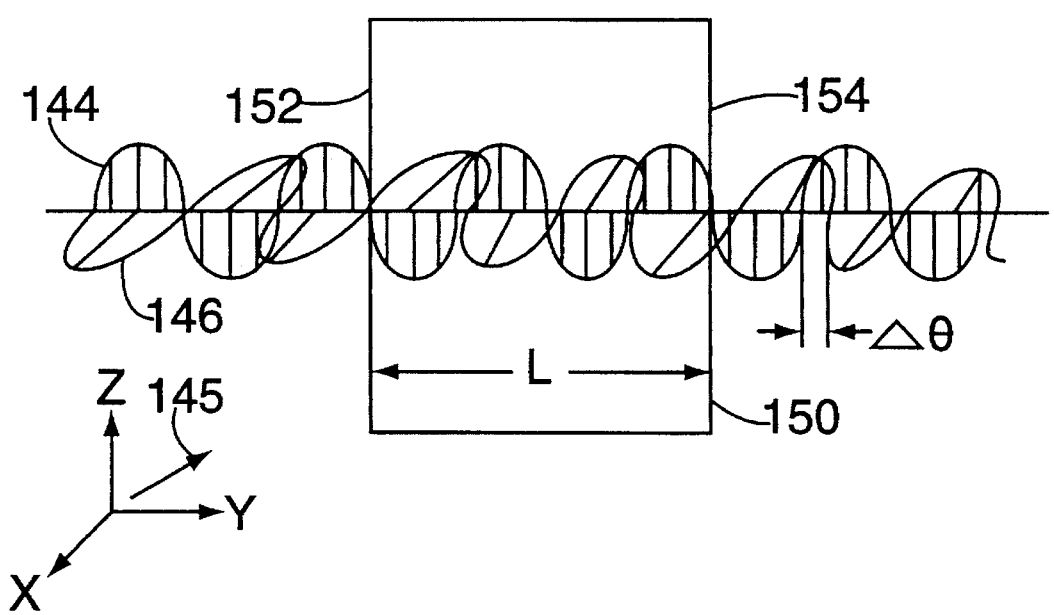
FIG. 2 is a schematic exemplifying the concept of birefringence of a linearly polarized wave.

FIG. 2 illustrates the principles of birefringence. Two orthogonally polarized waves 144 and 146 propagating through a birefringent element 150. The electric polarization vectors of these two waves are oriented in the X and Z directions, and the waves propagate in the Y direction. On entering face 152, the linearly polarized wave 145, propagates through element 150 at different velocities due to different refractive indices in the x and z planes. Therefore, waves 144 and 146, which exhibited a zero phase difference before entering element 150, now exhibit a certain phase difference $\Delta\theta$ on exiting face 154. The phase difference depends on the difference in the indices of refraction, the path length, L, through the birefringent element 150, the temperature of crystal 150 and the wavelength of the broad band light source.

Referring again to FIG. 1, system 20 utilizes a broad band light source 22 as may be generated by a plurality of wide band LEDs. The broad band light source 22 is randomly polarized and is focused by lens 24 into a multi-mode optical fiber 26. The light output of fiber 26 is collimated by lens 28, such as a gradient index lens, and is directed through a polarizer 29 that passes only linear polarized light preferably with a>100:1 extinction ratio to provide an acceptable signal-to-noise, ratio. However, an extinction ration of as little as 2:1 would still provide an acceptable signal for this invention. Polarizer 29 is aligned so that it transmits the linearly polarized light at 45° to the optical axis of birefringent crystal elements 30 and 32.

Figure 3:
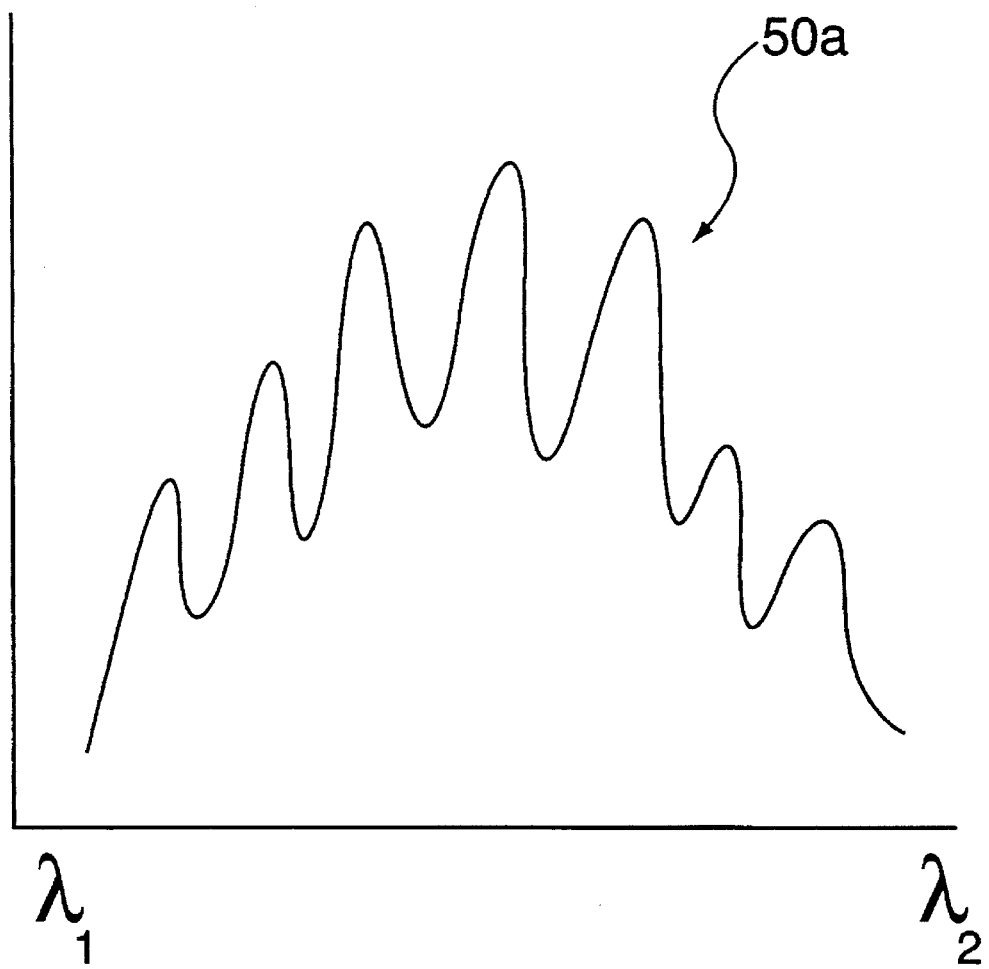
FIG. 3 is an example of a fringe pattern of a modulated light spectrum.

Propagation of the linearly polarized wave through birefringent crystal 30 introduces a temperature dependent phase shift, $\Delta\theta$, between the two waves (FIG. 2). A partial reflective coating 31, applied to the back end of crystal 30, reflects approximately 20 to 40 percent of the light passing through crystal 30 to yield a first reflective light signal that travels back through crystal 30, polarizer 29, lens 28 and fiber optic cable 26. The polarized light is birefringently biased by crystal 30 to produce a birefringence length product of approximately $A \cdot \lambda$, where $\lambda$, is the central wavelength of the light source 22. When reflected light pattern 50 passes through polarizer 29, polarizer 29 functions as an analyzer. Polarizer 29 combines the first and second phase-shifted, orthogonally polarized waves to yield a first modulated light spectrum 50*a* having a fringe pattern such as shown in FIG. 3. This signal is the same as a reflective birefringent temperature sensor whose modulation is due to temperature changes from a dB/dT term of the birefringence.

The approximately 60 to 80 percent of the non-reflected light that passes through crystal 30 then passes through crystal 32. The light output from the combined bias elements 30 and 32 pass through the isotropic sensor material 40 such as fused silica, YAG, or glass. Sensor 40 is preferably rectangular-shaped for ease of manufacturing, however, it may be other geometric shapes, as for example, shown in FIG. 5. Opposing flats 43 and 43*a* are polished onto the edge of the disk perpendicular to the major faces 41 and 41*a*, for the beam to propagate transversely through sensor 40. Major faces 41 and 41*a* are preferably polished to increase the mechanical strength of sensor 40.

Figure 5:
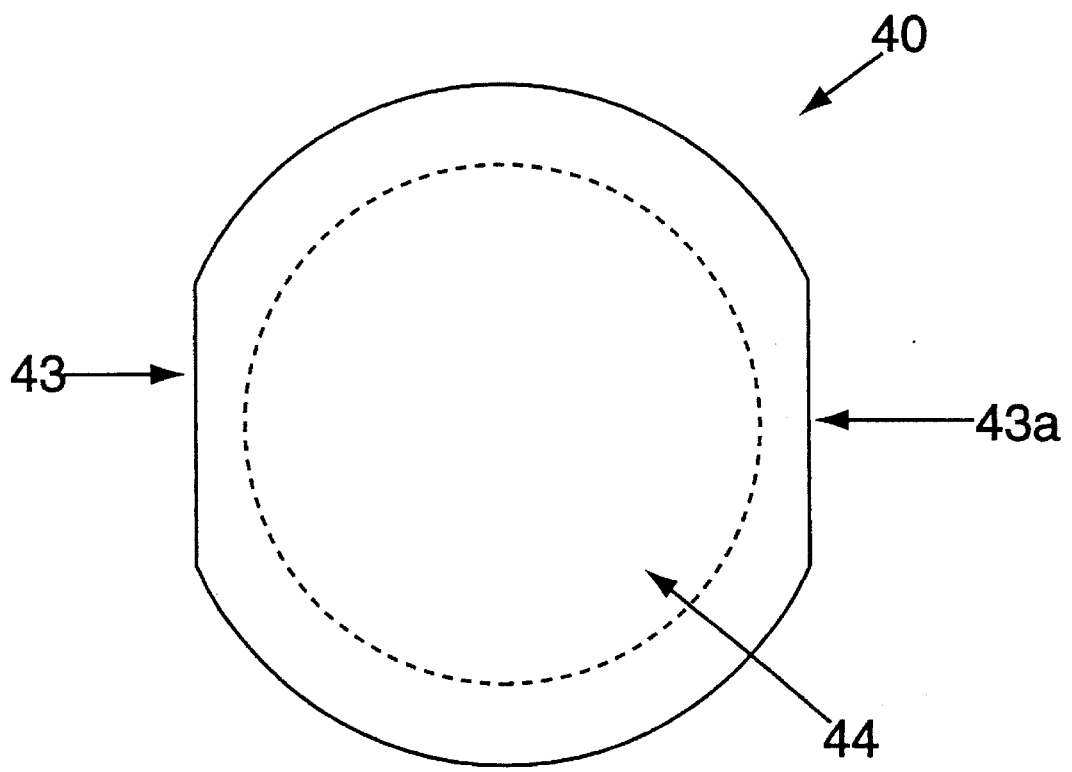
FIG. 5 is a plan view of one embodiment of sensor 20.

Referring to FIG. 1, sensor 40 rests on a base 42 such that a reference pressure, for example, a vacuum, is present in a cavity 44. Preferably, cavity 44 is circular as shown in FIG. 5 to eliminate point stresses. The sensitivity of sensor 20 relates to the physical parameters of sensor 20 such as thickness, diameter, birefringent constant, Young's Modulas and Poisson's coefficient. For example, bending stress is proportional to $(W/D)^3$. Therefore, in order to measure wide ranges of pressure accurately, it is preferred that dimension W is much greater that dimension D. Thickness D determines the operating parameters of sensor 20 before failure due to rupture. For example, W may be in the range of 0.5 to 1.0 inches, and D is about 0.040 to 0.080 inches.

Figure 4:
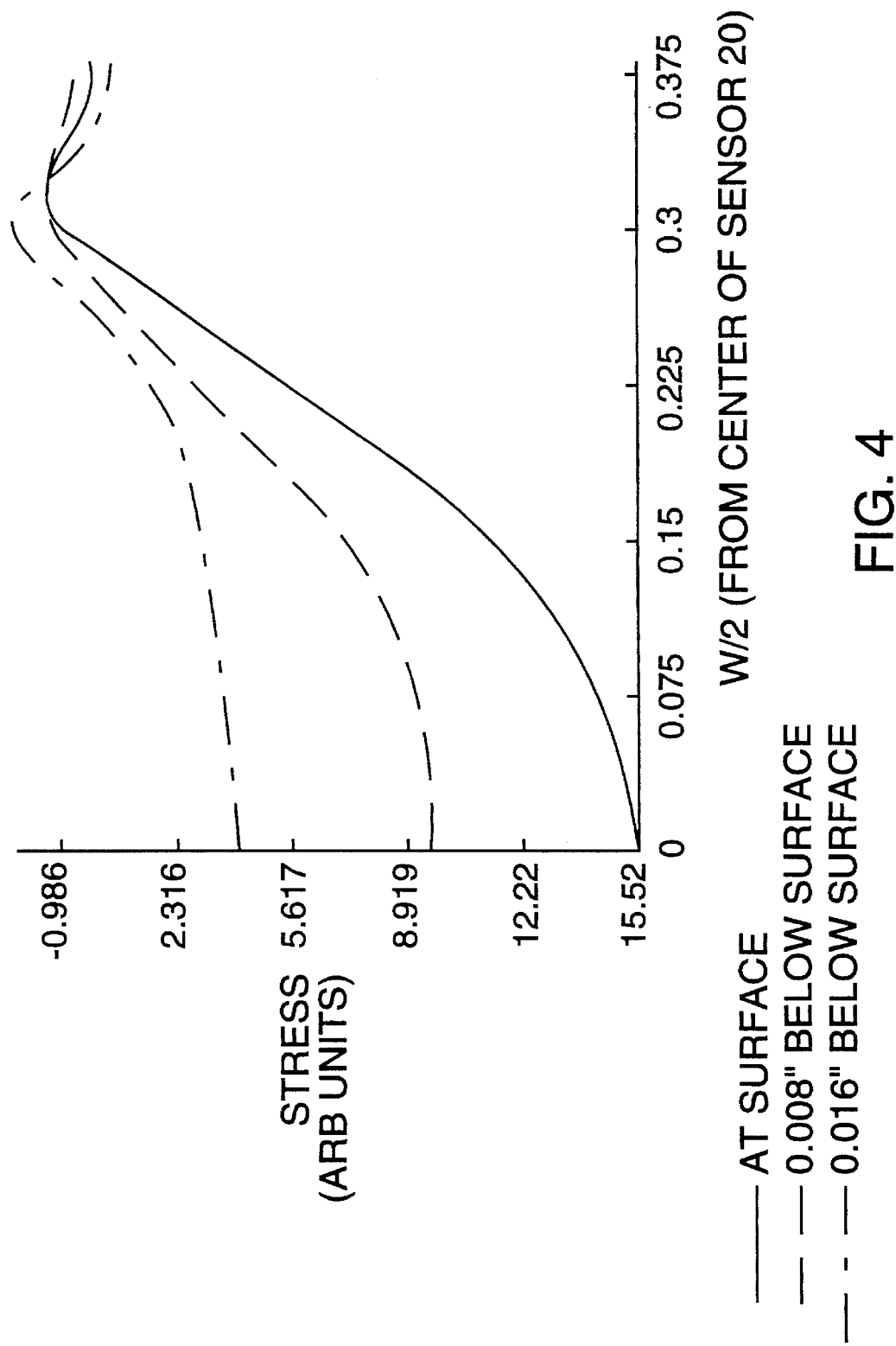
FIG. 4 is a graphical representation of stresses within a pressure sensor.

With pressure F exerted on surface 41, compressive or tensile stresses are induced in sensor 40. Such stresses comprise compressive stresses in the upper half D/2 dimension and tensile stresses in the lower half D/2 dimension and each extend in a direction orthogonal to the propagation of light. Actual stress measurements along dimension W are shown in FIG. 4 which illustrates maximum compressive stresses at the surface and center of sensor 20. Tensile stresses are of the same magnitude, but opposite in sign. At the geometric midpoint M of sensor 40, the stresses cancel each other out and the effective stress is zero. Accordingly, the biased collimated light source passing through sensor 40 is directed so that it is perpendicular to flat 43 and passes near surface flat 41 or 41*a*, where integration of the maximum stress-induced birefringence takes place.

The measured compressive stress extends in a direction orthogonal to the propagation of light through sensor 40. The photoelastic effect of such orthogonal stresses upon the transmitted light flux is to delay one of the components of light, $L_x$ with respect to the other component $L_z$. "Photoelasticity" by Max Mark Frocht, Volume II, Chapter 10, pages 333–37, John Wiley & Sons, Inc. 1948 and "Principles of Optics" by Max Born and Emil Wolf, Fifth Ed., pages 703–05, Pergamon Press, 1975 detail the photoelastic effect of stress birefringence. The optical phase delay is produced by stress-induced birefringence that causes the biased light passing through sensor 40 to experience a further phase delay $\Delta\theta'$ which is proportional to pressure F applied to sensor 40. The delaying effect is cumulative along the light path, and an extended light path magnifies and increases the sensitivity of sensor 40.

After passing through sensor 40, the light wave reflects off a highly reflective surface 46 positioned on the back surface of sensor 40 and parallel to the input flat. The reflected light retraces the incident path to yield a second reflective light signal. The second reflective light signal re-traces the path through crystal 32 causing the light signal to receive additional bias and then further attenuation by reflective coating 31. The light continues through crystal 30, receives more bias, then through polarizer 29. Polarizer 29 acts as an analyzer and yields a second modulated light spectrum representative of the environmental temperature and external pressure experienced by system 20. The light spectrum is collimated by lens 28 and transmits to fiber optic cable 26. Coatings 31 and 46 cause a flux reduction so the second modulated light spectrum represents only a percentage of the light that entered sensor 40 assuming that all other surfaces are anti-reflective coated for the wavelengths involved. The first and second modulated light spectrums are essentially in parallel and form a combined temperature and pressure related light spectrum.

Preferably, a "Y" splitter 60 divides the combined light spectrum so that some percent of the light is split off to an opto-electronic interface 62, such as a spectrometer having a fiber optic input and a ccd array output. The light spectrum is focused onto an array of photodetectors or a charge coupled detector which yields an intensity vs. wavelength fringe pattern represented by FIG. 6.

Figure 7:
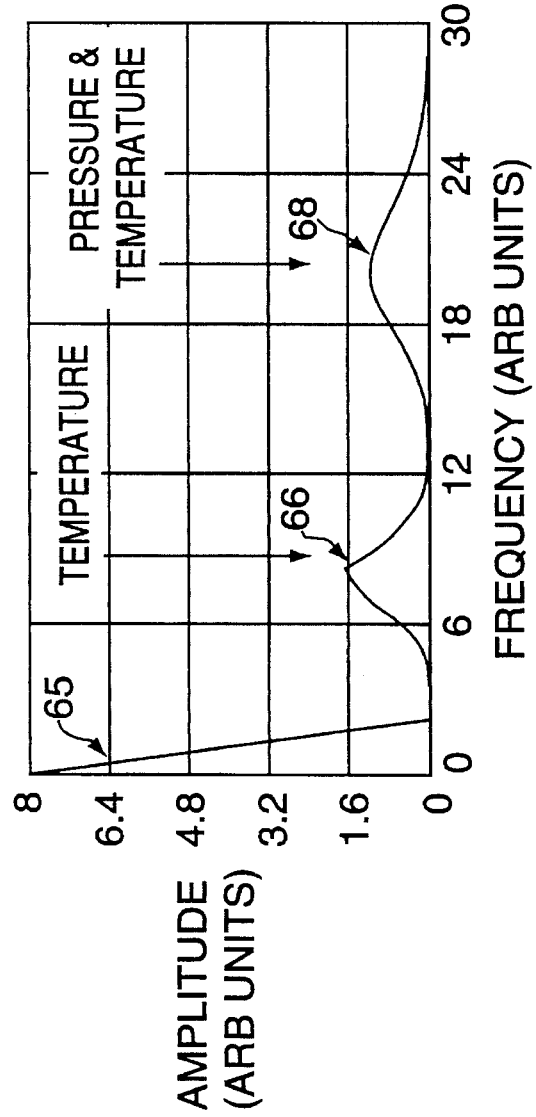
FIG. 7 is a representation of a Fourier Transform of the waveform of FIG. 6.
Figure 8:
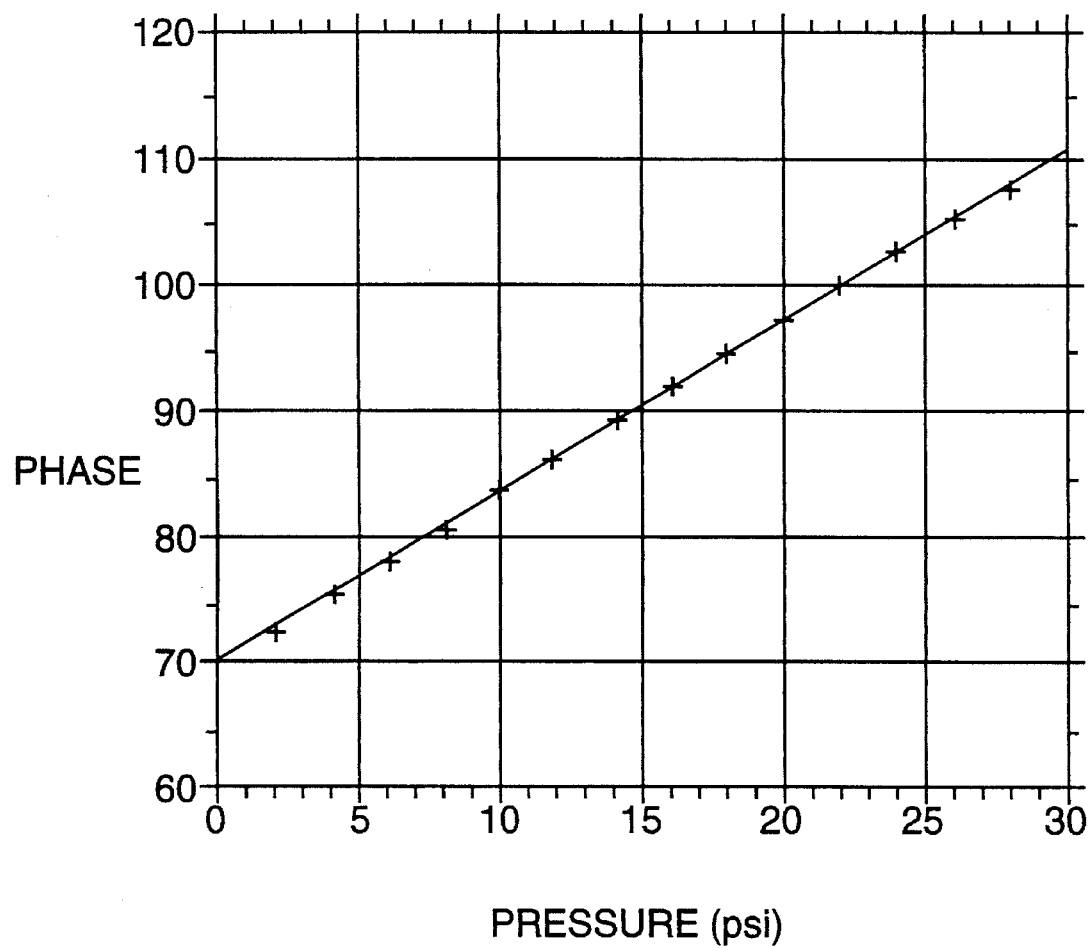
FIG. 8 is a graphical representation of the linear relationship between the external pressure and phase changes.
Figure 8A:
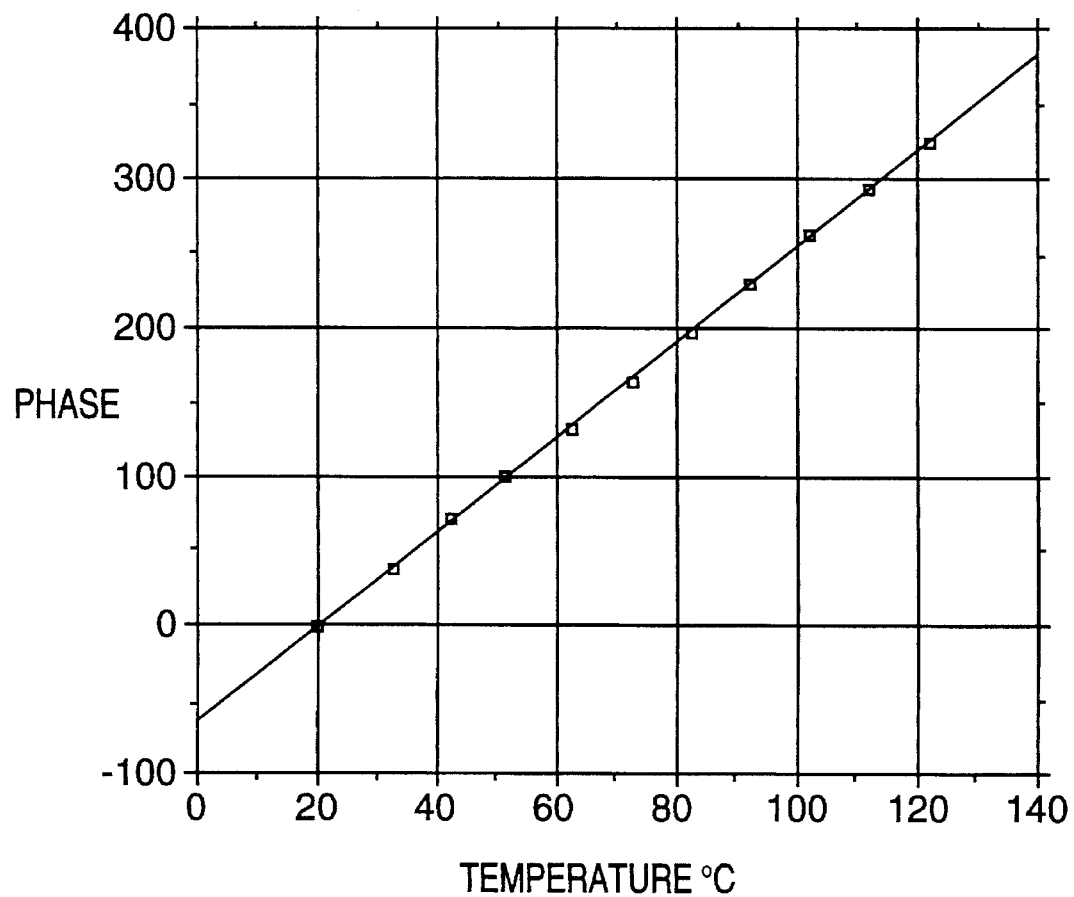
FIG. 8a is a graphical representation of the linear relationship between the environmental temperature and phase changes.

The fringe pattern is processed by a CPU 64 which generates a Fourier transform to yield amplitude and phase information, represented by FIG. 7. The measured phase shift of the transformed signal is a direct representation of the environmental temperature and the external pressure F. Because the signal contains two effective bias terms, there are two frequency signals. Frequency signal 66 is due to the environmental temperature of crystal 30 and frequency signal 68 is due to the external temperature experienced by bias crystals 30 and 32 and sensor 40 and the external pressure applied to sensor 40. Since the temperature of the sensor can be obtained from the phase information of first peak 66, the temperature dependence of the second peak can be subtracted out giving the term due to the externally applied pressures. Higher order terms are possible, but at significantly lower amplitudes due to multiple reflections from the reflective surfaces 31 and 46. A graphical representation of both pressure and temperature vs. phase changes are shown in FIGS. 8 and 8a respectively.

A significant advantage of the reflective mode of the present invention is that the isotropic sensor is double passed which increases its sensitivity by two. This allows a greater design flexibility in the choice of sensor materials and in the size of the sensor. This added flexibility is desired since at high external loadings it is possible to rupture the sensor. Another benefit is the use of a single fiber optic line.

EXAMPLE

Figure 1A:
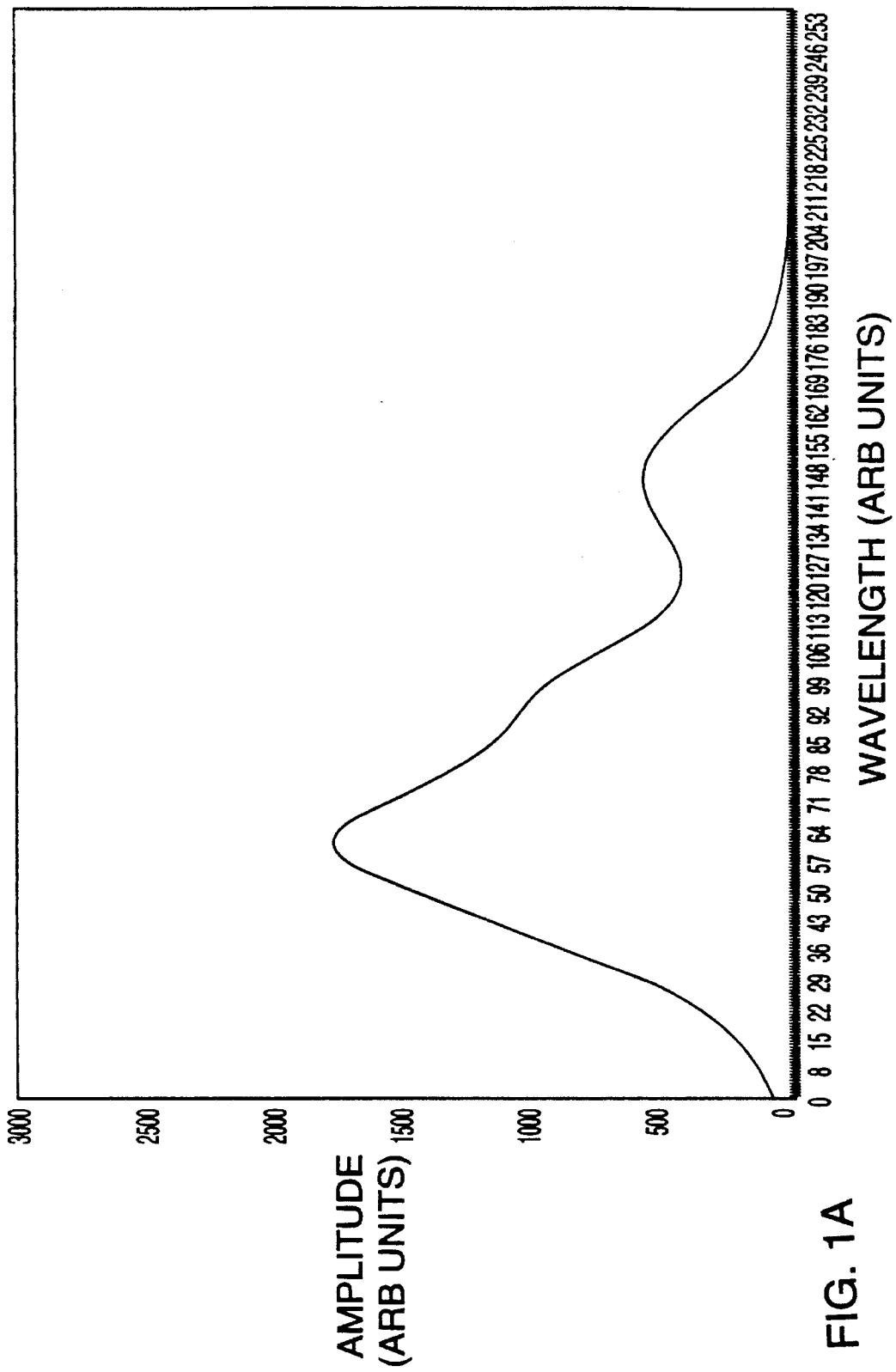
FIG. 1a is a representation of the amplitude/frequency waveform of a broad band light source.

The light source 22 used in a demonstration unit consists of a single LED package that contains three LEDs. This generates a wavelength spectrum as shown in FIG. 1a. The 10% end points are at 760 and 900 nm respectively; the pixel numbers associated with FIG. 1a are the ccd array element numbers. The opto-electronic interface 62 has a 256 element ccd array as the detection system. Dispersion elements inside the unit have pixel number 1 at 748 nm and pixel number 256 at 960 nm. The entire LED spectrum is therefore observed on the ccd array yielding intensity vs. wavelength information. In the preferred case there will be six to ten fringes produced on this ccd array due to the action of polarizer 29 and bias crystals 30 and 32. Six to ten fringes have been determined to give the required system accuracy and low production costs of the hardware involved. This number of fringes determines the amount of birefringence length product that the, bias crystals.

In this demonstration, the birefringence crystal was BeL having a birefringence of 0.0378 at 830 nm. Crystal 30 was cut to a length of 0.323 mm, and crystal 32 was cut to a length of 0.203 mm. Solving for equations 1 and 2 gives a value of about 30 for coefficient A and a value of about 50 for coefficient B. Sensor 20 was a square-shaped fused-silica disk having a thickness of 1 mm and length of 0.72 inches. Cavity 44 was 0.6 inches in diameter.

Figure 6:
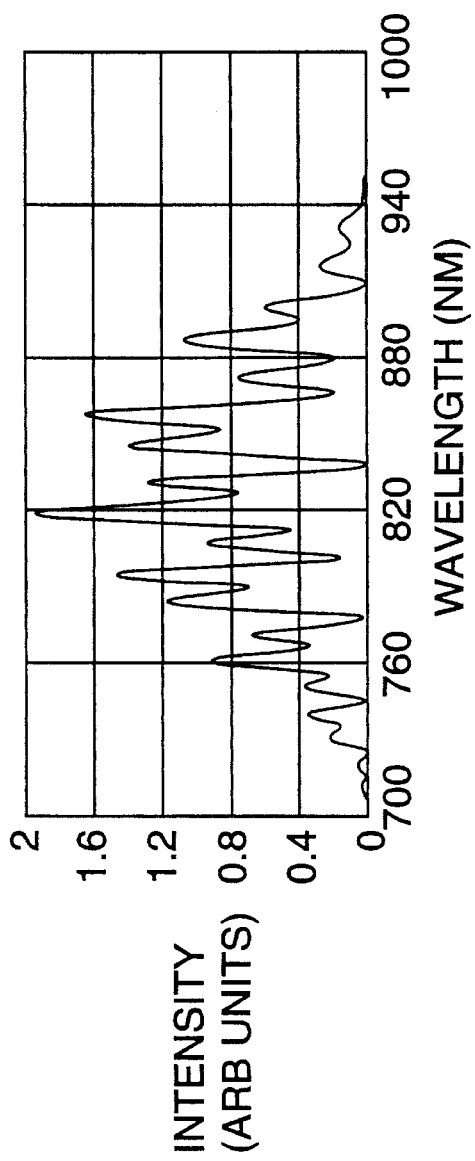
FIG. 6 is an intensity vs. wavelength waveform of a combined temperature and temperature/pressure waveform generated by an opto-electronic interface.

FIG. 6 illustrates the intensity vs. wavelength pattern observed at optoelectronic interface 62. FIG. 7 represents the Fourier transform of the waveform in FIG. 6. The lowest frequency component 65 is the near dc component and light source 22. Component 66 is due to the double pass of crystal 30 and can be also detected as the lower modulated frequency in the FM signal of FIG. 6. The phase information of component 66 is directly related to the environmental temperature of crystal 30. Component 68 is due to the double pass of both bias crystals and sensor element 40. This can be seen in FIG. 6 as the highest frequency modulation. The phase information of this component is directly related to the environmental temperature and pressure applied to sensor 20.

We claim:

1. An integrated sensor system for providing a signal indicative of environmental temperature and pressure conditions comprising:

a) a linear polarizer element for orienting an initial broad band light spectrum into a linearly polarized light wave;

b) a first birefringent biasing element located adjacent said linear polarizer element for receiving said polarized wave, said polarized wave decomposing into first and second orthogonally polarized waves and experiencing a phase difference on propagating through said first element and said first element comprising means for directing a first portion of said phase-shifted light wave through said polarizer to create a first modulated light spectrum responsive to said environmental temperature;

c) a second birefringent element located adjacent said first element for receiving a second portion of said phase-shifted light wave propagating through said first element and causing said first and second orthogonally polarized waves to experience a further phase difference on propagating through said second element; and d) a photoelastic sensing means of transparent material for receiving the light output of said second element wherein an application of pressure to said sensing means causes stress-induced birefringence causing said first and second orthogonally polarized waves to experience a still further phase difference on propagating through said sensing means; and e) means for directing the light wave output of said sensor to said polarizer element to create a second modulated light spectrum responsive to said environmental pressure.

2. The integrated sensor system of claim 1 further comprising:
   f) an opto-electronic interface for accepting a combined signal comprising said first and second modulated light spectrums to generate a corresponding electrical signal; and
   g) signal conditioning electronics for analyzing said electrical signal and to extract a waveform at pre-selected frequencies indicative of said environmental temperature and pressure.

3. The integrated sensor system of claim 1 further comprising means for collimating said initial polarized broad band light spectrum.

4. The integrated senor of claim 1 further comprising means for directing said first portion of said phase-shifted light wave through said first element before traveling through said polarizer.

5. The integrated sensor of claim 1 further comprising means for twice directing said light wave through said sensor before traveling through said polarizer.

6. The integrated sensor of claim 5 further comprising means for directing said light wave output from said sensor through said first and second elements before traveling through said polarizer.

7. The integrated sensor of claim 1 further comprising means for directing said first portion of said phase-shifted light wave through said first element before traveling through said polarizer and means for twice directing said light wave through said sensor before traveling through said polarizer.

8. The integrated sensor of claim 7 wherein the birefringent bias of said first element is defined as:

$$2 \cdot ABS \cdot [L_1 \cdot B_1] = A \cdot \lambda$$

and the combined birefringent bias of said first and second elements is defined $$2 \cdot ABS \cdot [L_1 \cdot B_1 + L_2 \cdot B_2] = B \cdot \lambda$$

where A and B are values from about 20 to about 60 and A<B.

9. The integrated sensor of claim 1 wherein said first and second birefringent elements are Beryllium Lanthanate having a birefringence of 0.0378 at 830 nm.

* * * * *